United States Patent
Yoshida (10) Patent No.: US 10,350,834 B2
(45) Date of Patent: Jul. 16, 2019

(54) SLICE IMAGE CREATION DEVICE, THREE-DIMENSIONAL PRINTING SYSTEM, AND SLICE IMAGE CREATION METHOD

(71) Applicant: Roland DG Corporation, Hamamatsu-shi, Shizuoka (JP)

(72) Inventor: Makoto Yoshida, Hamamatsu (JP)

(73) Assignee: ROLAND DG CORPORATION, Shizuoka (JP)

(*) Notice: Subject to any disclaimer, the term of this patent is extended or adjusted under 35 U.S.C. 154(b) by 223 days.

(21) Appl. No.: 15/177,380

(22) Filed: Jun. 9, 2016

(65) Prior Publication Data

US 2016/0361877 A1   Dec. 15, 2016

(30) Foreign Application Priority Data

Jun. 10, 2015 (JP) ................. 2015-117419

(51) Int. Cl.
  *B29C 67/00* (2017.01)
  *B29C 64/129* (2017.01)
  *B29C 64/386* (2017.01)
  *B33Y 30/00* (2015.01)
  *B33Y 50/02* (2015.01)

(52) U.S. Cl.
  CPC ........ *B29C 67/0088* (2013.01); *B29C 64/129* (2017.08); *B29C 64/386* (2017.08); *B33Y 30/00* (2014.12); *B33Y 50/02* (2014.12)

(58) Field of Classification Search
  CPC ......... B33Y 10/00; B33Y 30/00; B33Y 50/00; B33Y 10/02
  See application file for complete search history.

(56) References Cited

U.S. PATENT DOCUMENTS

| 6,259,962 B1 | 7/2001 | Gothait |
| 2016/0019319 A1* | 1/2016 | Shtilerman ............. G06T 17/10 264/308 |

FOREIGN PATENT DOCUMENTS

| JP | 2001-184528 A | 7/2001 |
| JP | 2001-239591 A | 9/2001 |
| JP | 2001-347573 A | 12/2001 |
| JP | 2002-210834 A | 7/2002 |
| JP | 2003-535712 A | 12/2003 |
| WO | 2014/141273 A2 | 9/2014 |

* cited by examiner

*Primary Examiner* — Ryan M Ochylski
(74) *Attorney, Agent, or Firm* — Keating & Bennett, LLP (57) ABSTRACT

A desired whole slice image corresponding to a whole object is created in a slice image creation device, in which a synthesis processor overlaps a target slice image created by a target slice image creation processor and a support slice image created by a support slice image creation processor. The synthesis processor determines a portion of the overlap region corresponding to a target printing region of the target slice image and/or a support printing region of the support slice image as a whole printing region to be printed, and determines a portion of the overlap region corresponding to both of a target non-printing region of the target slice image and a support non-printing region of the support slice image as a whole non-printing region not to be printed. The synthesis processor colors the whole printing region and the whole non-printing region with different colors to create the whole slice image.

4 Claims, 8 Drawing Sheets

SLICE IMAGE CREATION DEVICE, THREE-DIMENSIONAL PRINTING SYSTEM, AND SLICE IMAGE CREATION METHOD

CROSS REFERENCE TO RELATED APPLICATION

The present application claims priority to Japanese Patent Application No. 2015-117419 filed on Jun. 10, 2015, which is incorporated by reference herein in its entirety.

BACKGROUND OF THE INVENTION

1. Field of the Invention

The present invention relates to a slice image creation device, a three-dimensional printing system, and a slice image creation method.

2. Description of the Related Art

Conventionally, a three-dimensional printing device that prints a desired three-dimensional object (hereinafter, referred to as a "target object") is known. This type of three-dimensional printing device uses, for example, a computer-aided design device (hereinafter, referred to also as a "CAD device") to create data on a three-dimensional model which is usable to print the target object (hereinafter, such a three-dimensional model will be referred to as a "target object model") (see, for example, Japanese PCT National-Phase Patent Publication No. 2003-535712). The target object model is sliced at a predetermined interval to create a plurality of two-dimensional slice models corresponding to cross-sectional shapes of the target object (hereinafter, such a two-dimensional slice model will be referred to as a "target slice model").

A target slice model is defined by a contour of the target object. The target slice model is divided into a printing region, which is to be printed, and a non-printing region, which is not to be printed, along the contour of the target object. Thus, for example, the printing region in the region of the target slice model is colored white and the non-printing region is colored black by the CAD device, so that a slice image (hereinafter, referred to as a "target slice image") is created from the target slice model.

A three-dimensional printing device includes, for example, a table provided with an opening, a tank that is located on the table and accommodates a photocurable resin, a holder that is located above the tank and is movable up and down, and an optical device that is located below the table and outputs light. Light that is output from the optical device is directed toward the photocurable resin in the tank through the opening in the table. A portion of the photocurable resin, accommodated in the tank, that is irradiated with the light is cured. The position to be irradiated with the light is controlled to appropriately change the position of the photocurable resin to be cured, so that a portion of the photocurable resin located in the region colored white, in the target slice image, is cured whereas a portion of the photocurable resin located in the region colored black is not cured. As a result, a cross-sectional shape conformed to the target slice image is formed. The holder is sequentially moved up to continuously expand the resin layer downward. In this manner, a desired target object is printed.

Figure 10A:
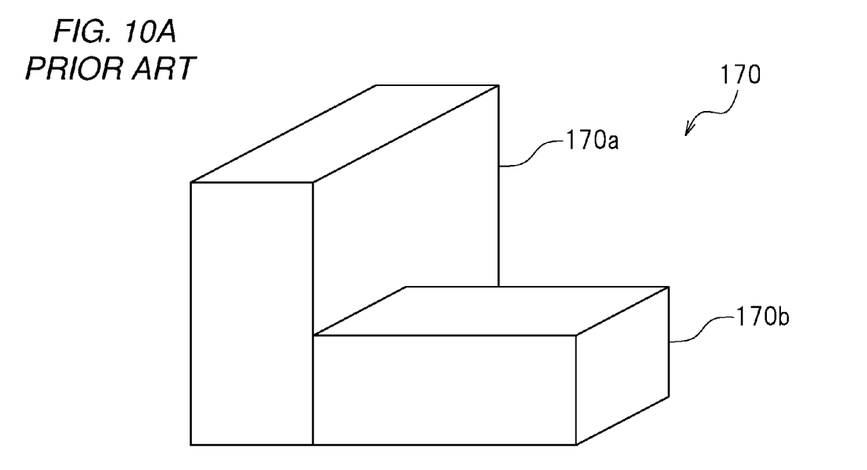
FIG. 10A is a perspective view of an example of target object used in the conventional art.
Figure 10B:
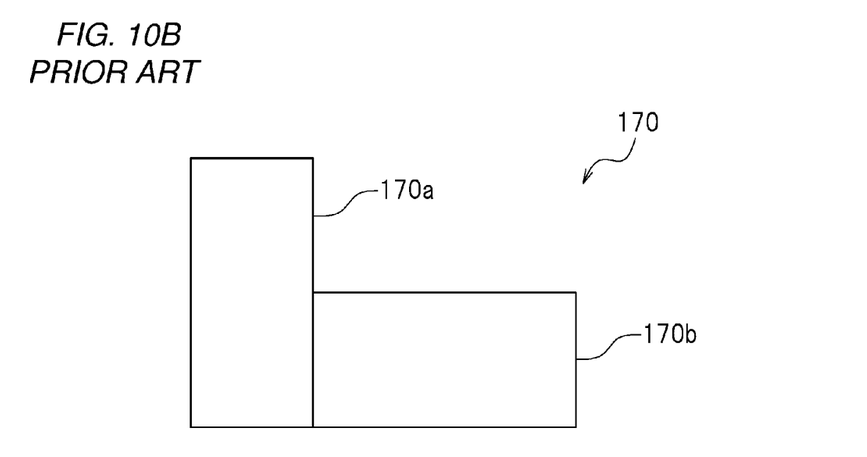
FIG. 10B is a plan view of the example of target object used in the conventional art.
Figure 11:
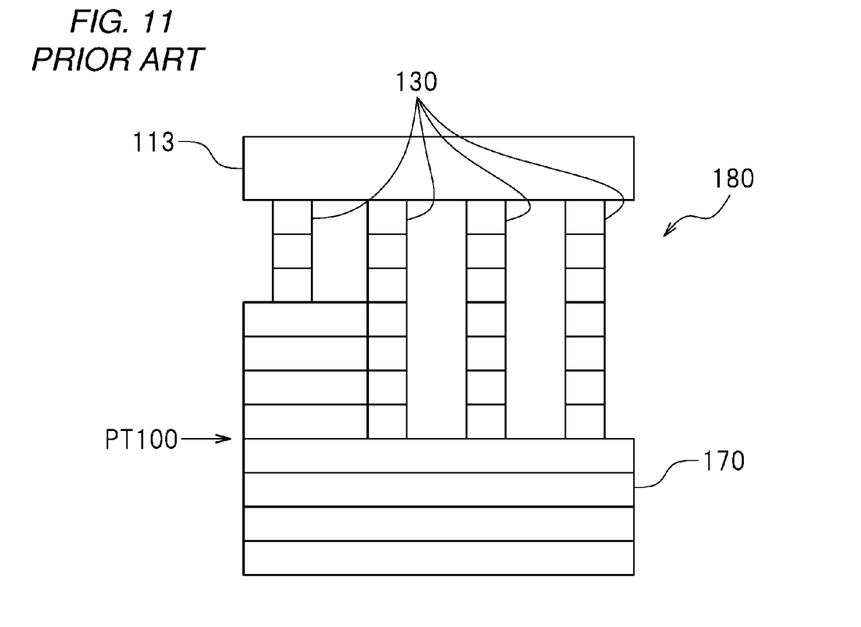
FIG. 11 is a schematic view showing a state where supports are attached and arranged on the target object shown in FIG. 10A and a holder.

While the holder is sequentially moved up, a certain resin layer supports the load of all the resin layers below the certain resin layer. Therefore, in the case where, for example, there is a resin layer having a small cross-sectional size, such a resin layer may not be able to support the load of all the resin layers printed below the resin layer. This may result in a portion of the target object being destroyed in the middle of the printing operation of the target object. For example, it is assumed that a target object 170 shown in FIG. 10A and FIG. 10B is to be printed. The target object 170 includes a first object 170a and a second object 170b having different sizes. The first object 170a and a second object 170b are located adjacent to each other. Referring to FIG. 11, in order to prevent a portion of the target object 170 from being destroyed during the printing operation, a plurality of support objects 130 are attached and arranged between a portion of the target object 170 and a holder 113. The plurality of support objects 130 support a portion of the load of the target object 170 during the printing operation. The plurality of support objects 130 are provided by a computation performed by a dedicated device such as a CAD device or the like. In this manner, an object 180 including the target object 170 (assembly of the first object 170a and the second object 170b) and the support objects 130 in an integral manner is printed (hereinafter, an object such as the object 180 will be referred to as a "whole object"). In the following description, the support objects will be referred to simply as "supports".

Figure 12:
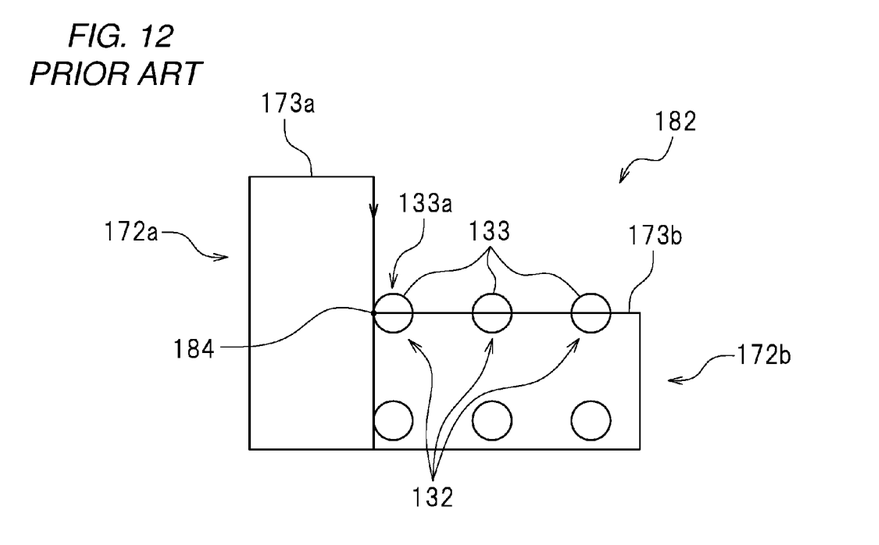
FIG. 12 shows an example of whole slice model created by the conventional art.

FIG. 12 shows a two-dimensional slice model 182 obtained as a result of slicing a three-dimensional model corresponding to the whole object 180 at position PT100 in FIG. 11. For printing the whole object 180 as described above, the CAD device slices a three-dimensional model corresponding to the whole object 180 (hereinafter, such as three-dimensional model will be referred to as a "whole object model") at a predetermined interval to create a plurality of the two-dimensional slice models 182 as shown in FIG. 12 (hereinafter, such a two-dimensional slice model will be referred to as a "whole slice model"). A printing region and a non-printing region of the whole slice model 182 are colored with different colors to create a slice image from each of the whole slice models 182 (hereinafter, the slice image created from the whole slice model will be referred to as a "whole slice image"). The slice image includes a contour that distinguishes the printing region and the non-printing region from each other. The slice image includes a multiplexed portion where, for example, a plurality of contours cross each other. The contour that distinguishes the printing region and the non-printing region from each other is one of the plurality of contours in the multiplexed portion. Usually, an outermost contour is the contour that distinguishes the printing region and the non-printing region from each other. Extracting such a contour will be occasionally referred to as "peeling".

However, the whole slice model 182 may include, in a mixed state, a contour 173a of a slice model 172a of the first object 170a (hereinafter, the slice model of the first object 170a will be referred to as the "first target slice model"), a contour 173b of a slice model 172b of the second object 170b (hereinafter, the slice model of the second object 170b will be referred to as the "second target slice model"), and contours 133 of a support slice model 132 obtained as a result of slicing the supports 130 at a predetermined interval. Thus, before creating the whole slice image, the CAD device traces the contours to obtain a contour that distinguishes the printing region and the non-printing region of the whole slice model 182 from each other (peeling), among the contour 173a of the first target slice model 172a, the contour 173b of the second target slice model 172b, and the contours 133 of the support slice model 132. For example, as shown in FIG. 12, the whole slice model 182 includes an intersection 184 at which the contour 173a, the contour 173b and a contour 133a cross each other. In the case where the CAD device traces the contour 173*a* as represented by the arrow in FIG. 12, the CAD device transfers from the contour 173*a* to the contour 133*a* at the intersection 184. However, at the intersection 184, there are a plurality of candidate contours to which the CAD device may transfer. Specifically, at the intersection 184, there are two contours to which the CAD device may transfer, namely, the contour 173*b* and the contour 133*a*. Therefore, there is a risk that the CAD device may transfer to the contour 173*b* despite that the CAD device should transfer to the contour 133*a*. When this occurs, the CAD device does not perform the desired peeling for the whole slice model 182 correctly, and thus may not create a desired whole slice image.

SUMMARY OF THE INVENTION

Preferred embodiments of the present invention provide a slice image creation device and a slice image creation method usable for a three-dimensional printing device, that prints a whole object including a target object and a support object attached and arranged thereon, to create a desired whole slice image, and also provide a three-dimensional printing system.

A slice image creation device according to a preferred embodiment of the present invention is a slice image creation device usable for a three-dimensional printing device that prints a whole object including a target object as a printing target and a support attached and arranged on the target object, the slice image creation device creating a whole slice image usable to print the whole object. The slice image creation device includes a storage processor, a target slice model creation processor, a support slice model creation processor, a target slice image creation processor, a support slice image creation processor, and a synthesis processor. The storage processor is configured or programmed to store a target object model as a three-dimensional model corresponding to the target object and to store a support object model as a three-dimensional model corresponding to the support. The target slice model creation processor is configured or programmed to slice the target object model at a predetermined interval to create a plurality of target slice models of the target object. The support slice model creation processor is configured or programmed to slice the support object model at the predetermined interval to create a plurality of support slice models of the support. The target slice image creation processor is configured or programmed to divide the region of each of the plurality of target slice models into a target printing region to be printed by the three-dimensional printing device and a target non-printing region not to be printed by the three-dimensional printing device to create a target slice image from each of the plurality of target slice models. The support slice image creation processor is configured or programmed to divide the region of each of the plurality of support slice models into a support printing region to be printed by the three-dimensional printing device and a support non-printing region not to be printed by the three-dimensional printing device to create a support slice image from each of the plurality of support slice models. The synthesis processor is configured or programmed to overlap the target slice image and the support slice image of the same layer as the target slice image, and to determine a portion of the overlap region that corresponds to at least one of the target printing region and the support printing region as a whole printing region to be printed by the three-dimensional printing device and determine a portion of the overlap region that corresponds to both of the target non-printing region and the support non-printing region as a whole non-printing region not to be printed by the three-dimensional printing device, to create the whole slice image.

According to the above-described slice image creation device, the target slice image corresponding to the target object, and the support slice image corresponding to the support, are separately prepared. The target slice image and the support slice image are overlapped on each other to create the whole slice image. Therefore, the peeling performed in the conventional art, namely, the operation of determining which of a plurality of contours of the target slice model and one contour of the support slice model is the contour distinguishing the printing region and the non-printing region of the whole slice model, is not performed. This avoids the problem that the desired contour of the whole slice model is not obtained. As can be seen, the slice image creation device obtains the desired whole slice model.

According to a preferred embodiment of the present invention, the target slice image creation processor is configured or programmed to color the target printing region and the target non-printing region with different colors. The support slice image creation processor is configured or programmed to color the support printing region and the support non-printing region with different colors. The synthesis processor is configured or programmed to color the whole printing region and the whole non-printing region with different colors.

According to the above-described preferred embodiment, in the target slice image, the support slice image, and the whole slice image, the printing region (the target printing region, the support printing region and the whole printing region) and the non-printing region (the target non-printing region, the support non-printing region and the whole non-printing region) are represented by different colors. Therefore, computation of the printing regions and computation of the non-printing regions performed on the pre-synthesis slice images, namely, computation performed both on the target slice image and the support slice image, are made easy. This decreases the amount of computations and also decreases the amount of data. As a result, the processing time is shortened.

According to another preferred embodiment of the present invention, the target slice image creation processor is configured or programmed to color the target slice image on a pixel-by-pixel basis. The support slice image creation processor is configured or programmed to color the support slice image on a pixel-by-pixel basis. The synthesis processor is configured or programmed to color the whole slice image on a pixel-by-pixel basis.

According to the above-described preferred embodiment, the target slice image, the support slice image and the whole slice image are colored on a pixel-by-pixel basis. Therefore, more detailed shapes are represented. Thus, the three-dimensional printing device prints the whole object with higher quality.

According to still another preferred embodiment of the present invention, the slice image creation device further includes a pre-process processor that performs a smoothing process as a pre-process on the target object model stored in the storage processor. The target slice model creation processor is configured or programmed to create the plurality of target slice models from the target object model smoothed by the pre-process processor.

According to the above-described preferred embodiment, the pre-process processor smooths the target object model to decrease the data amount of the target object model. Therefore, since the target slice model creation processor, the target slice image creation processor, and the synthesis processor use the target object model, the data amount of which is decreased by the pre-process processor. Thus, the computation load is decreased, which is preferable.

A three-dimensional printing system according to a preferred embodiment of the present invention includes a three-dimensional printing device that prints a three-dimensional object, and a slice image creation devices according to any one of the various preferred embodiments of the present invention described above.

The above-described three-dimensional printing system includes a slice image creation device according to any one of the various preferred embodiments of the present invention described above.

A slice image creation method according to a preferred embodiment of the present invention is a slice image creation method usable for a three-dimensional printing device that prints a whole object including a target object as a printing target and a support attached and arranged on the target object, the slice image creation method creating a whole slice image usable to print the whole object. The slice image creation method includes a target slice model creation step, a support slice model creation step, a target slice image creation step, a support slice image creation step, and a synthesis step. In the target slice model creation step, a target object model, as a three-dimensional model corresponding to the target object, is sliced at a predetermined interval to create a plurality of target slice models of the target object. In the support slice model creation step, a support object model, as a three-dimensional model corresponding to the support, is sliced at the predetermined interval to create a plurality of support slice models of the support. In the target slice image creation step, the region of each of the plurality of target slice models is divided into a target printing region to be printed by the three-dimensional printing device and a target non-printing region not to be printed by the three-dimensional printing device to create a target slice image from each of the plurality of target slice models. In the support slice image creation step, the region of each of the plurality of support slice models is divided into a support printing region to be printed by the three-dimensional printing device and a support non-printing region not to be printed by the three-dimensional printing device to create a support slice image from each of the plurality of support slice models. In the synthesis step, the target slice image and the support slice image forming the same layer with the target slice image are overlapped on each other, a portion of the overlap region that corresponds to at least one of the target printing region and the support printing region is determined as a whole printing region to be printed by the three-dimensional printing device, and a portion of the overlap region that corresponds to the target non-printing region and the support non-printing region is determined as a whole non-printing region not to be printed by the three-dimensional printing device, to create the whole slice image.

According to still another preferred embodiment of the present invention, in the target slice image creation step, the target printing region and the target non-printing region are colored with different colors. In the support slice image creation step, the support printing region and the support non-printing region are colored with different colors. In the synthesis step, the whole printing region and the whole non-printing region are colored with different colors.

According to still another preferred embodiment of the present invention, in the target slice image creation step, the target slice image is colored on a pixel-by-pixel basis. In the support slice image creation step, the support slice image is colored on a pixel-by-pixel basis. In the synthesis step, the whole slice image is colored on a pixel-by-pixel basis.

According to still another preferred embodiment of the present invention, the slice image creation method further includes a pre-process step of performing a smoothing process as a pre-process on the target object model. In the target slice model creation step, the plurality of target slice models are created from the target object model smoothed in the pre-process step.

According to various preferred embodiments of the present invention, a desired whole slice image corresponding to a whole object to be printed is obtained.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, a three-dimensional printing system including a slice image creation device according to a preferred embodiment of the present invention will be described. The preferred embodiment described below are not intended to limit the present invention to any specific preferred embodiment in any way. Elements and features having identical functions bear identical reference signs, and the same descriptions may be omitted appropriately or simplified.

Figure 1:
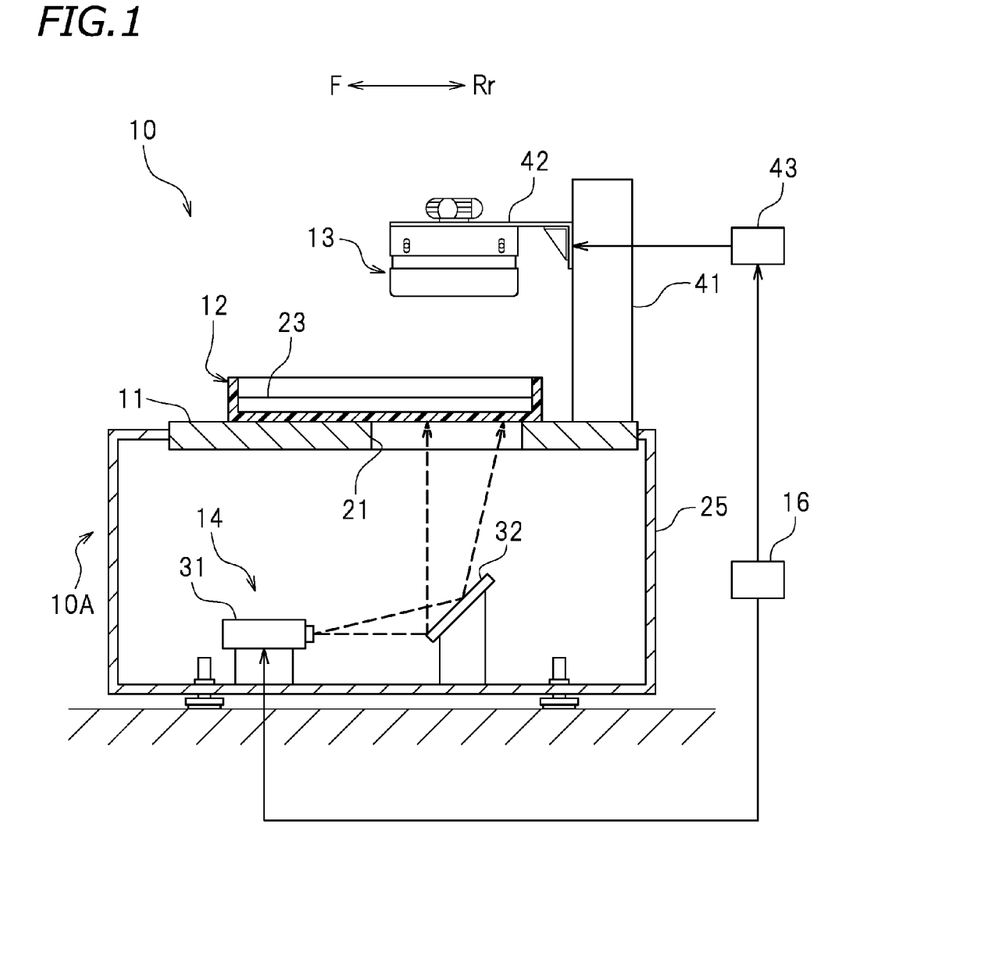
FIG. 1 is a cross-sectional view of a three-dimensional printing system according to a preferred embodiment of the present invention.
Figure 2:
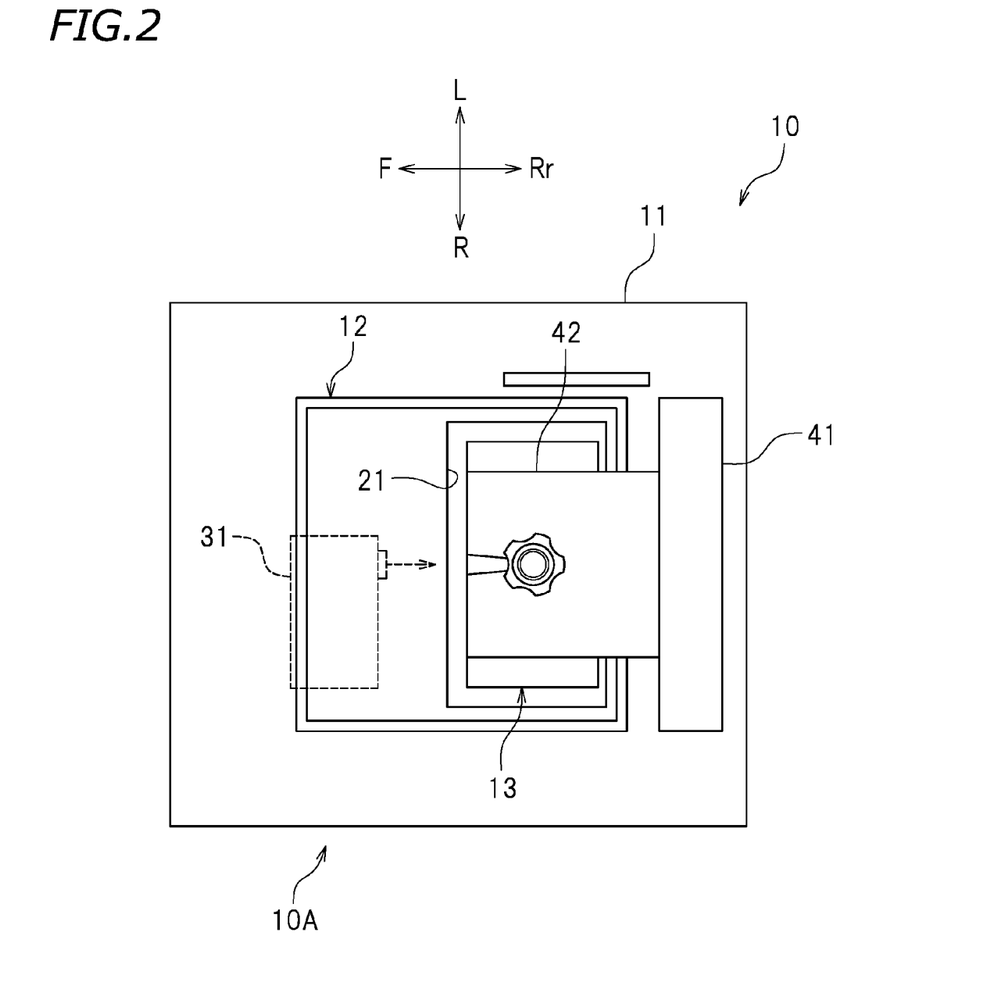
FIG. 2 is a plan view of a three-dimensional printing system according to a preferred embodiment of the present invention.

FIG. 1 is a cross-sectional view of a three-dimensional printing system 10 according to a preferred embodiment of the present invention. FIG. 2 is a plan view of the three-dimensional printing system 10. In the drawings, letters F, Rr, L and R respectively represent front, rear, left and right. These directions are provided merely for the sake of convenience, and do not limit the form of installation of the three-dimensional printing system 10 in any way.

The three-dimensional printing system 10 is a system that prints a three-dimensional object. As shown in FIG. 1, the three-dimensional printing system 10 includes a three-dimensional printing device 10A and a slice image creation device 100 (see FIG. 3). Preparing a cross-sectional shape of a three-dimensional object in advance, the three-dimensional printing device 10A cures a photocurable resin in a liquid state to form a resin layer having a shape corresponding to the prepared cross-sectional shape and sequentially stacks such resin layers to print a three-dimensional object. Herein, the term "cross-sectional shape" refers to the shape of a cross-section obtained as a result of slicing a three-dimensional object at a predetermined thickness (e.g., about 0.1 mm). A "photocurable resin" is a resin that is cured when being irradiated with light including a light component having a predetermined wavelength. The three-dimensional printing device 10A includes a table 11, a tank 12, a holder 13, an optical device 14, and a controller 16.

The table 11 is supported by a case 25. The table 11 is provided with an opening 21 through which light to be directed toward a photocurable resin 23 is allowed to pass. The tank 12 accommodates the photocurable resin 23 in a liquid state. The tank 12 is placed on the table 11 so as to be attachable to the table 11. As shown in FIG. 2, the tank 12 covers the opening 21 in the table 11 when being placed on the table 11. The tank 12 may be formed of a light-transmissive material, for example, a transparent material.

As shown in FIG. 1, the holder 13 is located above the tank 12 and above the opening 21 in the table 11. The holder 13 is movable up and down so as to be immersed in the photocurable resin 23 in the tank 12 when being lowered, and to pull up the photocurable resin 23 which is cured as a result of being irradiated with light when being raised up. In this example, the table 11 is provided with a column 41 extending in an up-down direction. A slider 42 is attached to the front of the column 41. The slider 42 is movable up and down along the column 41. The slider 42 is movable up and down by a motor 43. In this example, the holder 13 is attached to the slider 42, and is located to the front of the column 41. The holder 31 is movable up and down by the motor 43.

The optical device 14 is located below the table 11. The optical device 14 directs light having a predetermined wavelength toward the photocurable resin 23 in a liquid state that is accommodated in the tank 12. The optical device 14 is accommodated in the case 25 provided below the table 11. The optical device 14 includes a projector 31 and a mirror 32. The projector 31 is a light source emitting light, and is located below a front portion of the table 11. The projector 31 is located to the front of the holder 13. A lens is located to the rear of the projector 31. The projector 31 emits light in a front-to-rear direction via the lens. The mirror 32 reflects the light, emitted from the projector 31, toward the tank 12. The mirror 32 is located below the opening 21 located in the table 11 and to the rear of the projector 31. The light emitted from the projector 31 is reflected by the mirror 32 and is directed toward the photocurable resin 23 in the tank 12 through the opening 21 in the table 11.

The controller 16 is connected with the motor 43 controlling the slider 42, having the holder 13 attached thereto, to be movable up and down, and is also connected with the projector 31 in the optical device 14. The controller 16 drives the motor 43 to move the slider 42 and the holder 13 upward or downward. The controller 16 is configured or programmed to control the energy, luminosity, amount, wavelength band, and shape of the light emitted from the projector 31, the position in the photocurable resin 23 that is to be irradiated with the light, the timing to emit the light, and the like. There is no specific limitation on the structure of the controller 16. For example, the controller 16 may be a computer and may include a central processing unit (hereinafter, referred to as a "CPU") and a ROM, a RAM or the like storing a program or the like to be executed by the CPU.

The structure of the three-dimensional printing device 10A in this preferred embodiment has been described. The three-dimensional printing device 10A in this preferred embodiment prints a target object by use of a support. In other words, the three-dimensional printing device 10A prints a whole object including the target object and a support attached and arranged on the target object. In more detail, the three-dimensional printing device 10A prints a whole object as follows. Each time a resin layer is printed, the holder 13 is moved upward, and another resin layer is printed below the first resin layer. However, in the case where there is a resin layer having a small cross-sectional size, this resin layer may not be able to support the load of all the resin layer printed below this resin layer. When this occurs, the whole object may be destroyed during the printing operation. Thus, a support is printed together with the target object in order to sufficiently support the target object which is being printed. Such an arrangement prevents the target object from being destroyed during the printing operation.

It is assumed, for example, that the three-dimensional printing device 10A directly prints the target object on the holder 13. In this case, after the printing operation, the target object is peeled off from the holder 13. While a portion of the target object that is in contact with the holder 13 is being peeled off from the holder 13, the target object may be possibly destroyed. In this preferred embodiment, in order to prevent this, like with the conventional art shown in FIG. 11, a dedicated device such as a CAD device or the like performs computation to attached and arranged the supports 130 between the holder 113 (in this preferred embodiment, the holder 13) and the target object 170 (assembly of the first object 170a and the second object 170b). Thus, the whole object 180 (object integrally including the target object 170 and the supports 130) is printed. After the printing operation is finished, the whole object 180 is peeled off from the holder 113, and then the supports 130 are removed from the target object 170. In this manner, the target object 170 is prevented from being destroyed.

There is no specific limitation on the shape of the supports 130. The supports 130 may be, for example, a plurality of cylindrical columns of the same shape. In the example shown in FIG. 11, a top end of each support 130 is on the holder 113, and a bottom end of each support 130 is on the target object 170. The above-described shape of the supports 130 are merely one example. The supports 130 may have, for example, a triangular or quadrangular cross-section. The plurality of supports 130 may have the same shape, or a portion of the plurality of supports 130 may have a different shape. There is no specific limitation on the interval between the adjacent supports 130. For example, the supports 130 are located at a constant interval. The plurality of supports 130 may be located at an equal interval. The plurality of supports 130 may located in a left-right direction and a front-rear direction. The above-described positional relationship of the supports 130 is merely one example. The adjacent supports 130 do not need to be located at a constant interval. For example, the plurality of supports 130 may be located in a checkered pattern.

The whole object 180 is printed as follows. First, a whole object model is prepared as a three-dimensional model corresponding to the whole object 180 to be printed. As described above, the "whole object model" is an assembly of the target object model corresponding to the target object 170 and a support object model, which is a three-dimensional model corresponding to the supports 130. The whole object model is sliced in a horizontal direction at a predetermined interval to create a plurality of units of data on the whole slice models 182, which are two-dimensional slice models respectively corresponding to cross-sectional shapes of the whole object 180. The direction in which the whole object model is sliced is not limited to the horizontal direction, and may be, for example, a vertical direction. In this example, the "data on the whole slice model 182" is STL data.

For printing the whole object 180, a whole slice image converted from each of the plurality of whole slice models 182 is used. A "whole slice image" is, for example, a binary image. The whole slice image is divided into a printing region, which is to be printed, and a non-printing region, which is not to be printed. In this example, the printing region and the non-printing region are colored with different colors. For example, the printing region of the whole slice image is colored white. The non-printing region of the whole slice image is colored black. Alternatively, the printing region may be colored black, whereas the non-printing region may be colored white. The printing region and the non-printing region may be provided with different patterns.

As described above, the whole slice model 182 may include, in a mixed state, the contour 173a of the first target slice model 172a, the contour 173b of the second target slice model 172b, and the contours 133 of the support slice model 132. In this example, the contour 173a and the contour 173b are also become a contour of the target object 170 or the target object model. The contours 133 of the support slice model 132 may also be contours of the supports 130 of the support object model. Conventionally, before creating the whole slice image, the CAD device or the like traces the contours of the whole slice model 182 to extract a contour that shows the shape of the whole slice model 182 among the contour 173a of the first target slice model 172a, the contour 173b of the second target slice model 172b, and the contours 133 of the support slice model 132. As shown in, for example, FIG. 12, the whole slice model 182 includes the intersection 184 at which the contour 173a, the contour 173b and the contour 133a cross each other. In the case where the CAD device traces the contour 173a as represented by the arrow in FIG. 12, the CAD device transfers from the contour 173a to the contour 133a at the intersection 184. However, at the intersection 184, there are a plurality of candidate contours to which the CAD device may transfer. Specifically, at the intersection 184, there are two contours to which the CAD device may transfer, namely, the contour 173b and the contour 133a. Therefore, for the original purpose of the peeling, namely, for the purpose of extracting a desired contour of the whole slice model 182 that distinguishes the printing region and the non-printing region from each other, there is a risk that the CAD device may transfer to the contour 173b despite that the CAD device should transfer to the contour 133a. When this occurs, the CAD device does not perform the desired peeling for the whole slice model 182 correctly, and thus may not create a desired whole slice image.

Therefore, in this preferred embodiment, the slice image creation device 100 creates a desired whole slice image by use of a technique different from the conventional technique.

The present inventor has conceived of creating the whole slice image by separately creating a target slice image corresponding to the target slice model and a support slice image corresponding to the support slice model, and then synthesizing the target slice image and the support slice image. Herein, the expression that "the target slice image and the support slice image are synthesized" refers to overlapping the target slice image and the support slice image. A specific technique in this preferred embodiment used to create the whole slice image will be described below. By use of the technique in this preferred embodiment to create the whole slice image, the desired whole slice image is created without the above-described problem.

Figure 3:
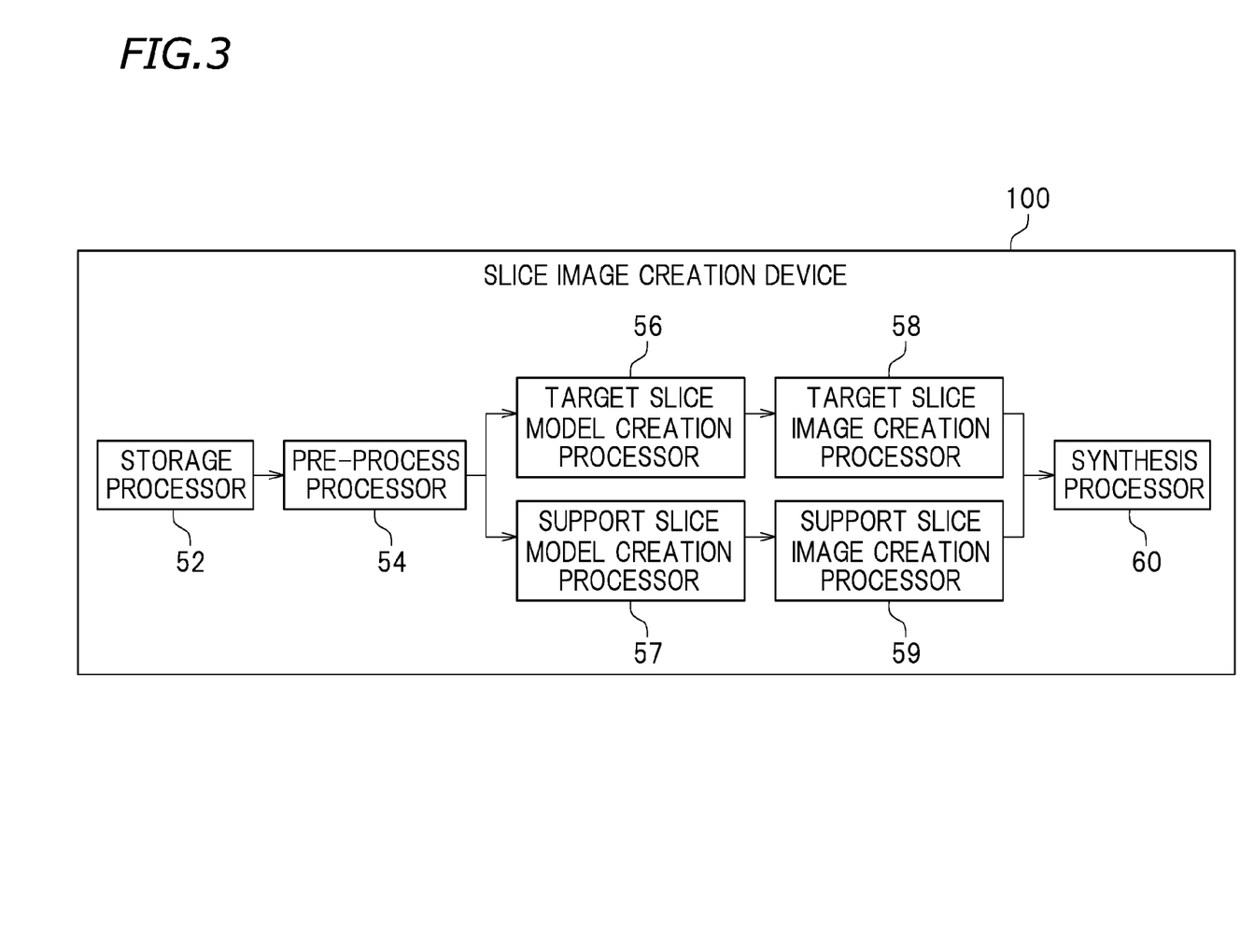
FIG. 3 is a block diagram of a three-dimensional printing system according to a preferred embodiment of the present invention.

FIG. 3 is a block diagram of the slice image creation device 100. The slice image creation device 100 may be separate from, or built in, the three-dimensional printing device 10A. The slice image creation device 100 may be, for example, a computer and may include a CPU, and a ROM, a RAM or the like storing a program or the like to be executed by the CPU. In this example, a program stored on the computer is used to create a whole slice image. The slice image creation device 100 may be a computer dedicated for the three-dimensional printing system 10 or a general-purpose computer.

The slice image creation device 100 includes a storage processor 52, a pre-process processor 54, a target slice model creation processor 56, a support slice model creation processor 57, a target slice image creation processor 58, a support slice image creation processor 59, and a synthesis processor 60. These processors may be implemented by execution of a computer program (hereinafter, referred to as a "program") stored on the slice image creation device 100. The processors may be implemented by software or hardware.

Figure 4:
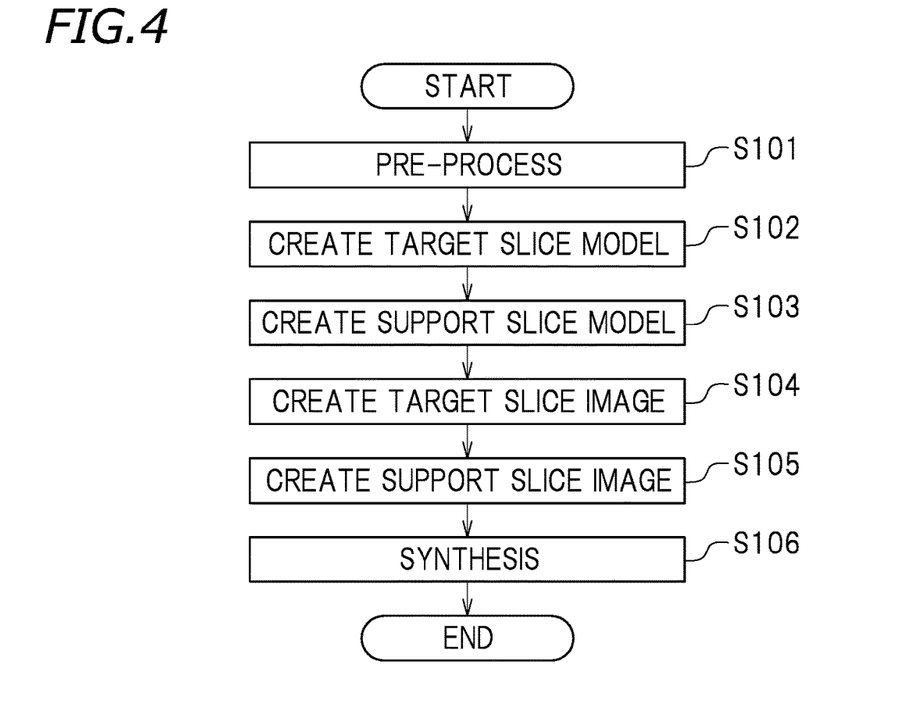
FIG. 4 is a flowchart showing a procedure of creating a whole slice image.
Figure 5:
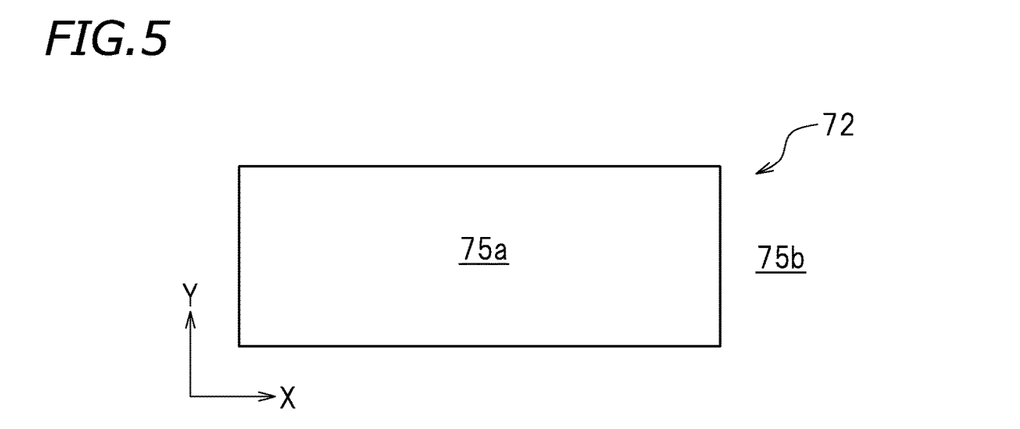
FIG. 5 shows an example of target slice model.
Figure 6:
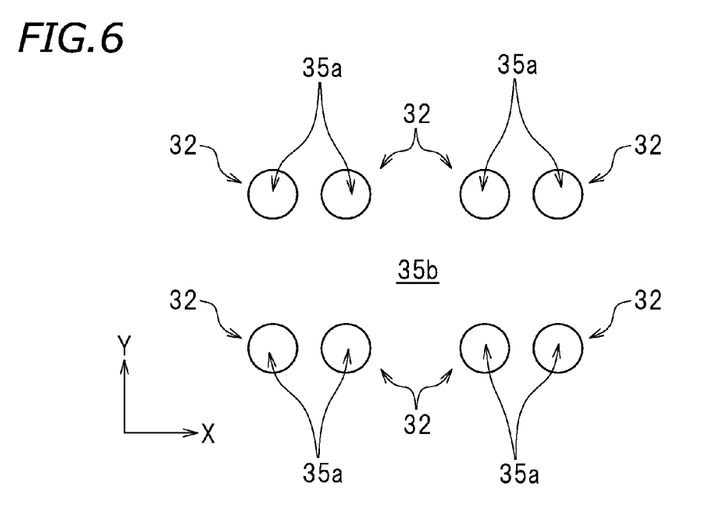
FIG. 6 shows an example of support slice model.
Figure 7:
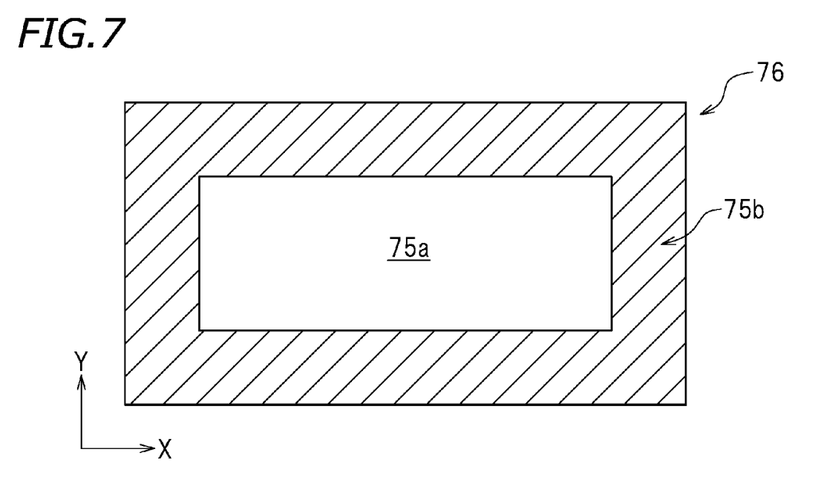
FIG. 7 shows a target slice image converted from the target slice model shown in FIG. 5.
Figure 8:
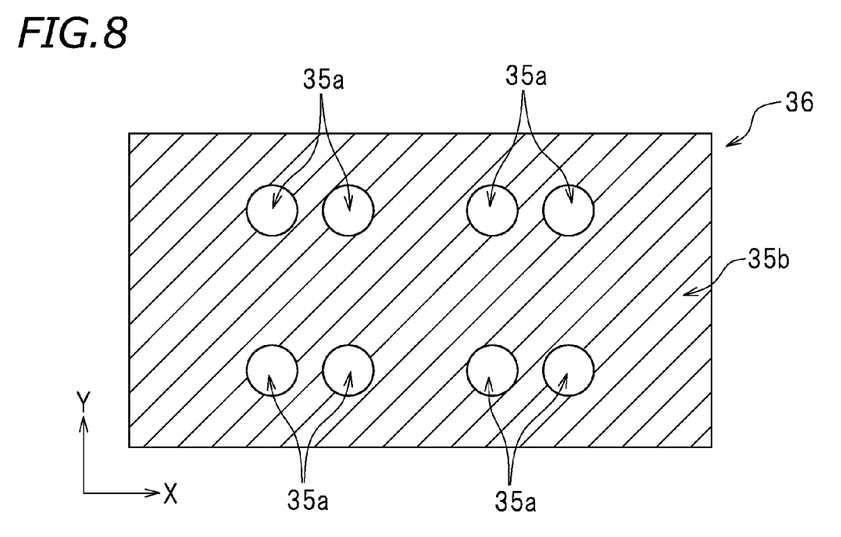
FIG. 8 shows a support slice image converted from the support slice model shown in FIG. 6.
Figure 9:
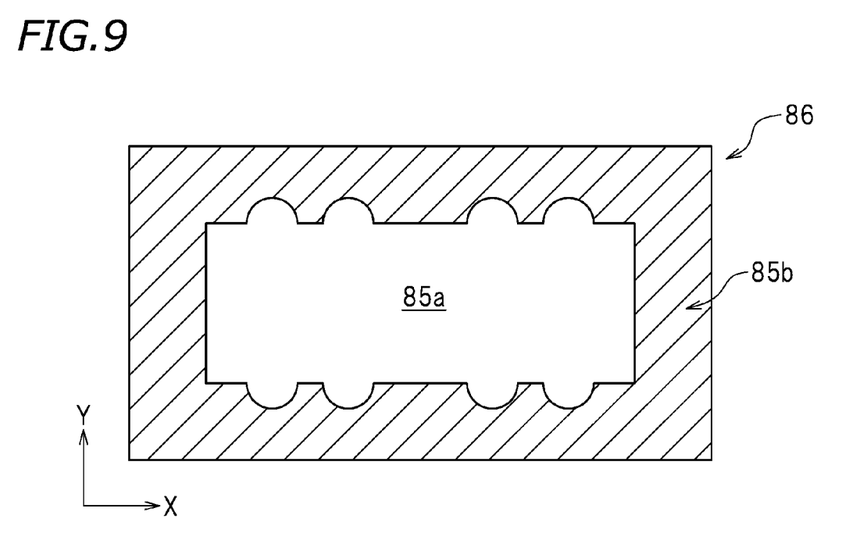
FIG. 9 shows a whole slice image obtained as a result of overlapping the target slice image shown in FIG. 7 and the support slice image shown in FIG. 8.

FIG. 4 is a flowchart showing a procedure of creating a whole slice image 86. FIG. 5 shows an example of target slice model 72. FIG. 6 shows an example of support slice models 32. FIG. 7 shows a target slice image 76 converted from the target slice mode 72 shown in FIG. 5. FIG. 8 shows a support slice image 36 converted from the support slice model 32 shown in FIG. 6. In this preferred embodiment, a slice image of supports to be printed is referred to as the "support slice image 36". FIG. 9 shows a whole slice image 86 obtained as a result of synthesis of the target slice image 76 shown in FIG. 7 and the support slice image 36 shown in FIG. 8. In this example, a procedure of creating the whole slice image 86 shown in FIG. 9 with reference to the flowchart shown in FIG. 4.

In this example, it is assumed that in the storage processor 52, data on the target object model corresponding the target object and data on the support object model corresponding to the supports to be attached and arranged on the target object are stored in advance. The data on the target object model is, for example, read onto the storage processor 52 from a storage medium or another computer (not shown) by an operation done by a user. The support object model is attached and arranged on the target object model in accordance with a predetermined rule by a dedicated program.

The target object model and the support object model are specified by, for example, a set of a plurality of points on an XYZ orthogonal coordinate system, and is a three-dimensional model. The target object model and the support object model respectively reproduce the target object and the supports by a combination of a plurality of polygons.

First, in step S101, the pre-process processor 54 performs a pre-process on the target object model. The target object model often consists of detailed data loyally reproducing a three-dimensional shape of the target object, which is a printing target. If the target object model is used as it is, the process of creating the whole slice image 86 performed by the slice image creation device 100 may require a huge amount of time. Therefore, it is preferable that the pre-process processor 54 is configured or programmed to perform a pre-process on the target object model to decrease the amount of data on the target object model. In this example, the pre-process processor 54 is configured or programmed to perform a smoothing process on the target object model. The smoothing process may, for example, decrease the number of polygons included in the target object model to decrease the data amount. There is no specific limitation on the method for the smoothing process. For example, a conventionally known method for the smoothing process may be used. For example, the Gaussian function may be used for the smoothing process. In this example, the data on the post-smoothing process target object model is stored in the storage processor 52. In step S101, the pre-process processor 54 may be configured or programmed to perform a pre-process on the support object model as well as on the target object model. In this case, the data amount of the support object model is also decreased. The pre-process in step S101 may be omitted.

Next, in step S102, the target slice model creation processor 56 creates a plurality of the target slice models 72. The target slice model 72 shown in FIG. 5 is an example of target slice model created by the target slice model creation processor 56. Specifically, the target slice model creation processor 56 is configured or programmed to slice the target object model stored in the storage processor 52 at a predetermined interval to create the plurality of target slice models 72. In this example, the "predetermined interval" is a value stored in the storage processor 52 in advance. There is no specific limitation on the direction in which the target object model is sliced. The direction may be, for example, a left-right direction or an up-down direction.

Next, in step S103, the support slice model creation processor 57 creates a plurality of the support slice models 32. The support slice models 32 shown in FIG. 6 are an example of support slice model 32 created by the support slice model creation processor 57. In this example, the support slice model creation processor 57 is configured or programmed to slice the support object model stored in the storage processor 52 at a predetermined interval to create the plurality of support slice models 32. The predetermined interval at which the support object model is sliced is the same as the predetermined interval used in step S102. The direction in which the support object model is sliced is the same as the direction in which the target object model is sliced. The target slice model 72 shown in FIG. 5 and the support slice model 32 shown in FIG. 6 form the same layer. The target slice model 72 created in step S102 and the support slice model 32 created in step S103 are associated with each other by position information defined by an XY coordinate system.

Next, in step S104, the target slice image creation processor 58 converts the plurality of target slice models 72 created in step S102 into images to create a plurality of the target slice images 76. In this example, the target slice image creation processor 58 is configured or programmed to convert the target slice models 72 into binary images. On a computer, an image is an assembly of pixels. Regarding each of the plurality of target slice models 72 as shown in FIG. 5, the target slice image creation processor 58 determines whether each of pixels in the target slice model 72 is a printing region 75a or a non-printing region 75b. In this preferred embodiment, the printing region 75a of the target slice model 72 corresponds to the "target printing region". The non-printing region 75b of the target slice model 72 corresponds to the "target non-printing region". In this example, as shown in FIG. 7, pixels located in the printing region 75a are colored white, whereas pixels located in the non-printing region 75b are colored black. In FIG. 7, the region colored black is hatched. The target slice image creation processor 58 is configured or programmed to color the pixels in the printing region 75a white and to color the pixels in the non-printing region 75b black to create the target slice image 76 from each of the target slice models 72.

Next, in step S105, the support slice image creation processor 59 converts the plurality of support slice models 32 created in step S103 into images to create a plurality of the support slice images 36 (see FIG. 8). In this example, the support slice images 36 are each a binary image like the target slice image 76. As shown in FIG. 6, the support slice image creation processor 59 divides each of the support slice models 32 into a printing region 35a and a non-printing region 35b. The support slice image creation processor 59 colors pixels located in the printing region 35a white and colors pixels located in the non-printing region 35b black to create the support slice image 36 shown in FIG. 8. In FIG. 8, the region colored black is hatched. In this preferred embodiment, the printing region 35a of the support slice model 32 corresponds to the "support printing region". The non-printing region 35b of the support slice model 32 corresponds to the "support non-printing region".

Next, in step S106, the synthesis processor 60 synthesizes the target slice image 76 and the support slice image 36 to create the whole slice image 86. In this example, the synthesis processor 60 is configured or programmed to extract one target slice image (e.g., the target slice image 76 in FIG. 7) from the plurality of target slice images 76 created by the target slice image creation processor 58 and to extract the support slice image corresponding to the extracted target slice image 76, namely, the support slice image forming the same layer as the extracted target slice image 76 (the extracted support slice image is, for example, the support slice image 36 shown in FIG. 8).

The synthesis processor 60 is configured or programmed to synthesize the extracted target slice image 76 shown in FIG. 7 and the extracted support slice image 36 shown in FIG. 8 to create the whole slice image 86 shown in FIG. 9. The target slice image 76 and the support slice image 36 may be synthesized as follows, for example. The synthesis processor 60 is configured or programmed to overlap the extracted target slice image 76 and the extracted support slice image 36 such that coordinates thereof corresponding to each other match each other.

Next, a determination is made on the overlap region as follows. In the overlap region, a portion corresponding to the printing region 75a of the target slice image 76 or the printing region 35a of the support slice image 36 is determined as a printing region 85a. In other words, in the overlap region, a portion corresponding to at least one of the printing region 75a of the target slice image 76 and the printing region 35a of the support slice image 36 is determined as the printing region 85a. Namely, in the overlap region, a portion corresponding to both of the printing region 75a of the target slice image 76 and the printing region 35a of the support slice image 36, and a portion corresponding to either the printing region 75a of the target slice image 76 or the printing region 35a of the support slice image 36, are each determined as the printing region 85a.

By contrast, in the overlap region, a portion corresponding to both of the non-printing region 75b of the target slice image 76 and the non-printing region 35b of the support slice image 36 is determined as a non-printing region 85b by the synthesis processor 60. In this preferred embodiment, the printing region 85a determined by the synthesis processor 60 corresponds to the "whole printing region". The non-printing region 85b determined by the synthesis processor 60 corresponds to the "whole non-printing region". The synthesis processor 60 is configured or programmed to color pixels in the printing region 85a white, and to color pixels in the non-printing region 85b black to create the whole slice image 86 shown in FIG. 9. In FIG. 9, the region colored black is hatched.

The three-dimensional printing device 10A prints a whole object in accordance with the whole slice image 86 created as described above. For example, the whole slice image 86 shown in FIG. 9 is used to print a cross-sectional shape corresponding to the whole slice image 86. Specifically, a portion of the photocurable resin 23 located in a region corresponding to the white region, namely, the printing region 85a, is irradiated with light emitted from the projector 31, so that the portion of the photocurable resin 23 located in the region corresponding to the printing region 85a is cured. By contrast, a portion of the photocurable resin 23 located in a region corresponding to the black region, namely, the non-printing region 85b, is not irradiated with light emitted from the projector 31, so that nothing is printed in the region corresponding to the non-printing region 85b.

As described above, in this preferred embodiment, the target slice image 76 (see FIG. 7) corresponding to the target object to be printed, and the support slice image 36 (see FIG. 8) corresponding to the supports to be printed, are separately prepared. The synthesis processor 60 synthesizes the target slice image 76 and the support slice image 36 to create the whole slice image 86. Therefore, the peeling performed in the conventional art described with reference to FIG. 11, namely, the operation of determining which of the contours 173 of the target slice model 172 and the contour 133 of the support slice model 132 is the contour distinguishing the printing region and the non-printing region of the whole slice model 182, is not performed. This avoids the problem that the desired contour of the whole slice model is not obtained. As can be seen, the slice image creation device 100 in this preferred embodiment obtains the desired whole slice model 86 as shown in FIG. 9.

In this preferred embodiment, in the target slice image 76, the support slice image 36, and the whole slice image 86, the printing region and the non-printing region are represented by different colors. Specifically, the printing region is colored white, whereas the non-printing region is colored black. Therefore, computation of the printing regions and computation of the non-printing regions performed on the pre-synthesis slice images, namely, the target slice image 76 and the support slice image 36, are made easy. This decreases the amount of computations and also decreases the amount of data. As a result, the processing time is shortened.

In this preferred embodiment, the target slice image creation processor 58 is configured or programmed to color the target slice image 76 on a pixel-by-pixel basis. The support slice image creation processor 59 is configured or programmed to color the support slice image 36 on a pixel-by-pixel basis. The synthesis processor 60 is configured or programmed to color the whole slice image 86 on a pixel-by-pixel basis. As a result, the target slice image 76, the support slice image 36 and the whole slice image 86 are colored on a pixel-by-pixel basis. Therefore, more detailed shapes are represented. Thus, the three-dimensional printing device 10A prints the whole object with higher quality.

In this preferred embodiment, the pre-process processor 54 smooths the target object model to decrease the data amount of the target object model. Therefore, the target slice model creation processor 56, the target slice image creation processor 58, and the synthesis processor 60 use the target object model, the data amount of which is decreased by the pre-process processor 54. Thus, the computation load is decreased, which is preferable.

The processors of the slice image creation device 100, namely, the storage processor 52, the pre-process processor 54, the target slice model creation processor 56, the support slice model creation processor 57, the target slice image creation processor 58, the support slice image creation processor 59 and the synthesis processor 60, may be implemented by one processor included in the slice image creation device 100. Alternatively, these processors may be implemented by a plurality of processors. According to various preferred embodiments of the present invention, the expression "is configured or programmed" encompasses executing a computer program stored on a computer. Various preferred embodiments of the present invention encompass a non-transitory computer readable medium having the computer program stored thereon temporarily. Various preferred embodiments of the present invention encompass a circuit having substantially the same function as that of the program to be executed by each of the processors. In this case, the storage processor 52, the pre-process processor 54, the target slice model creation processor 56, the support slice model creation processor 57, the target slice image creation processor 58, the support slice image creation processor 59 and the synthesis processor 60 may be respectively replaced with a storage circuit 52, a pre-process circuit 54, a target slice model creation circuit 56, a support slice model creation circuit 57, a target slice image creation circuit 58, a support slice image creation circuit 59 and a synthesis circuit 60.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principles of the present invention. These preferred embodiments are provided with the understanding that they are not intended to limit the present invention to the preferred embodiments described in the specification and/or shown in the drawings. The present invention is not limited to the preferred embodiment described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or referred to during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-dimensional printing system, comprising:
a three-dimensional printing device prints a whole object including a target object as a printing target and a support attached and arranged on the target object; and
a slice image creation device usable for the three-dimensional printing device that prints the whole object, the slice image creation device creating a whole slice image usable to print the whole object, the slice image creation device comprising:
a storage processor configured or programmed to store a target object model as a three-dimensional model corresponding to the target object and store a support object model as a three-dimensional model corresponding to the support;
a target slice model creation processor configured or programmed to slice the target object model at a predetermined interval to create a plurality of target slice models of the target object;
a support slice model creation processor configured or programmed to slice the support object model at the predetermined interval to create a plurality of support slice models of the support;
a target slice image creation processor configured or programmed to divide a region of each of the plurality of target slice models into a target printing region to be printed by the three-dimensional printing device and a target non-printing region not to be printed by the three-dimensional printing device to create a target slice image from each of the plurality of target slice models;
a support slice image creation processor configured or programmed to divide the region of each of the plurality of support slice models into a support printing region to be printed by the three-dimensional printing device and a support non-printing region not to be printed by the three-dimensional printing device to create a support slice image from each of the plurality of support slice models; and
a synthesis processor configured or programmed to overlap the target slice image and the support slice image defining a same layer as the target slice image, and determine a portion of an overlap region that corresponds to at least one of the target printing region and the support printing region as a whole printing region to be printed by the three-dimensional printing device and determine a portion of the overlap region that corresponds to both of the target non-printing region and the support non-printing region as a whole non-printing region not to be printed by the three-dimensional printing device, to create the whole slice image, wherein
the three-dimensional printing device prints the whole object according to the whole printing region and the whole non-printing region of the whole slice image created by the synthesis processor.

2. The three-dimensional printing system according to claim 1, wherein
the target slice image creation processor is configured or programmed to color the target printing region and the target non-printing region with different colors;
the support slice image creation processor is configured or programmed to color the support printing region and the support non-printing region with different colors; and
the synthesis processor is configured or programmed to color the whole printing region and the whole non-printing region with different colors.

3. The three-dimensional printing system according to claim 1, wherein
the target slice image creation processor is configured or programmed to color the target slice image on a pixel-by-pixel basis;
the support slice image creation processor is configured or programmed to color the support slice image on a pixel-by-pixel basis; and
the synthesis processor is configured or programmed to color the whole slice image on a pixel-by-pixel basis.

4. The three-dimensional printing system according to claim 1, wherein:
the slice image creation device further includes a pre-process processor that is configured or programmed to perform a smoothing process as a pre-process on the target object model stored in the storage processor; and
the target slice model creation processor is configured or programmed to create the plurality of target slice models from the target object model smoothed by the pre-process processor.

* * * * *